(No Model.)
F. J. BROWN.
TANK FOR WATERING STOCK.
No. 304,165. Patented Aug. 26, 1884.
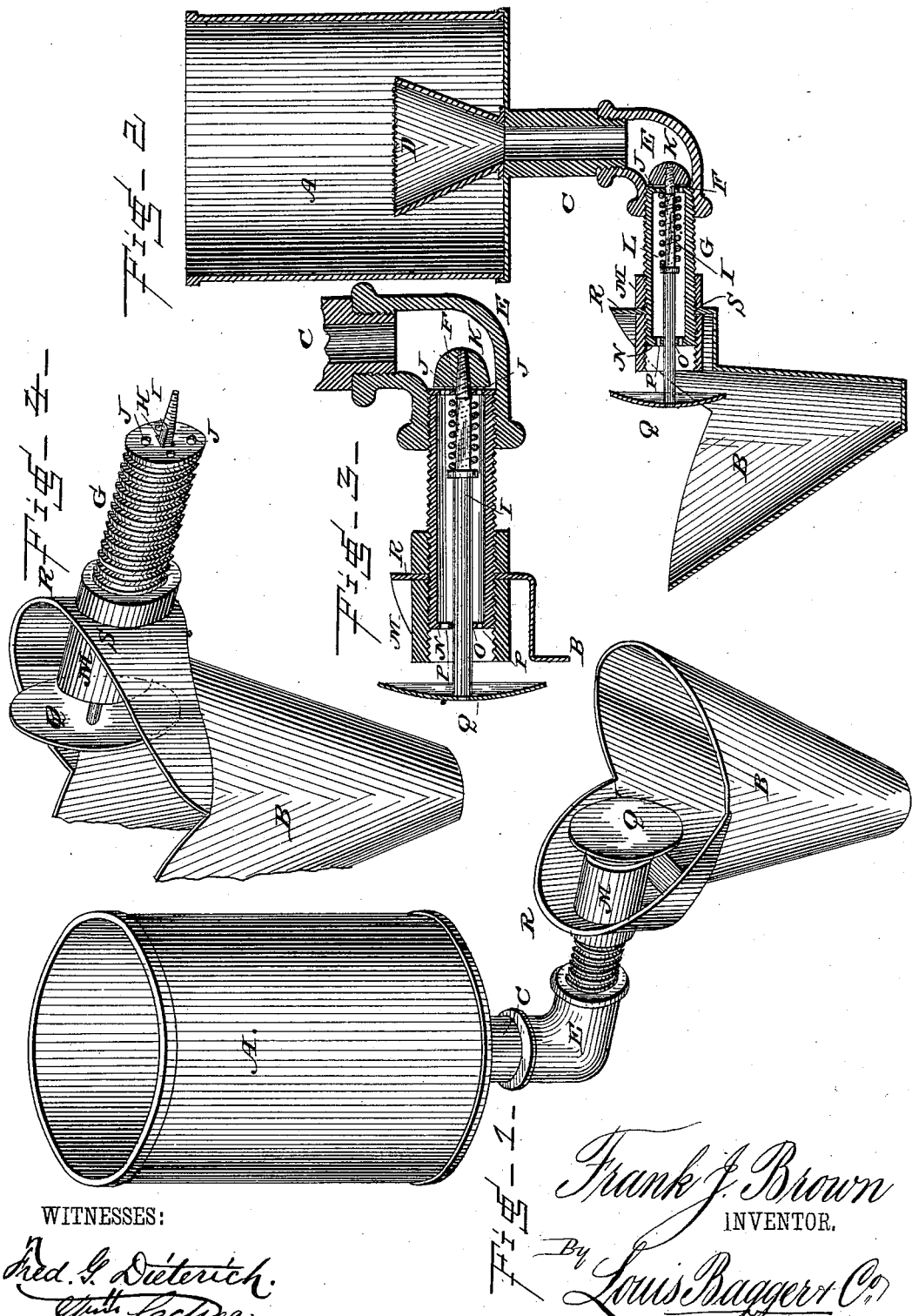
WITNESSES:
Frank J. Brown
INVENTOR.
By Louis Bagger & Co.
ATTORNEYS.

UNITED STATES PATENT OFFICE.

FRANK J. BROWN, OF HALSTEAD, KANSAS.

TANK FOR WATERING STOCK.

SPECIFICATION forming part of Letters Patent No. 304,165, dated August 26, 1884.

Application filed March 26, 1884. (No model.)

*To all whom it may concern:*

Be it known that I, FRANK J. BROWN, a citizen of the United States, and a resident of Halstead, in the county of Harvey and State of Kansas, have invented certain new and useful Improvements in Tanks for Watering Stock; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved tank for watering stock. Fig. 2 is a vertical sectional view of the same. Fig. 3 is a longitudinal section of the valve mechanism, and Fig. 4 is a perspective view of parts of the same.

Similar letters of reference indicate corresponding parts in all the figures.

My invention has relation to devices for watering stock; and it consists in the improved construction and combination of parts of a device in which the animal will open a valve with its head when dipping its muzzle into the trough for the purpose of drinking, allowing the water to flow only as long time as it is drinking, thus allowing of no waste of the water and preventing it from becoming unfit for use by standing in the trough, as hereinafter more fully described and claimed.

In the accompanying drawings, the letter A indicates the tank, which may be of any desired construction, and which is preferably placed above the trough B, with which it is connected by means of a pipe, C. The upper end of the pipe is provided with a basket of wire-cloth, D, which serves as a strainer, and the lower end of the pipe is secured into one arm of an elbow, E, the other end of which is screwed upon a pipe-section, G, the end of which, which is screwed into the elbow, is provided with a perforated plate, F, having a central perforation, H, in which the valve-stem I slides with its inner end, and a number of smaller straining-perforations, J. A valve, K, is secured upon the end of the valve-stem, bearing against the perforated plate which forms the valve-seat, and a spiral spring, L, is secured at its outer end to the valve-stem, and bears with its inner end against the perforated valve-seat, serving to force the stem outward, causing the valve to bear against its seat. The outer end of the pipe-section through which the valve-stem passes is provided with a nut, M, turning upon the threaded outer side of the pipe, and with a cap, N, fitting upon the end of the pipe, having a central perforation, O, through which the valve-stem passes, and with a number of perforations, P, through which the water may pass. The outer end of the valve is provided with a rounded disk, Q, against which the animal may press its muzzle or forehead when drinking out of the trough, which is preferably inverted conical and provided at its upper edge with a wing, R, having a perforation, S, which fits upon the end of the pipe, and is secured between the nut upon the same and the cap upon the outer end of the pipe. The trough being contracting toward the bottom, and being sufficiently narrow to force the animal to press its head or snout against the plate or button, will force the animal to operate the valve when it wants to drink, and will at the same time, by its form, prevent the animal from draining the trough, thus allowing a small quantity of water to remain in the trough, so as to offer it as an inducement for the next animal to drink. In this manner there will be enough water left in the trough to induce the next animal to drink, and while drinking to let out enough water for its own use, and at the same time the shape of the trough and the small quantity of water remaining in it will not induce hogs to step up into the trough, and thus soil the water for other animals, the hydrant thus always supplying clean and fresh water for the stock.

Having thus described my invention, I claim and desire to secure by Letters Patent of the United States—

1. The combination of a tank, a trough contracting toward its bottom, a connecting-pipe opening in the upper end of the trough, and a valve having a spring closing it, and provided with a plate or button upon its stem, adapted to be pushed in by the head of the animal drinking, as and for the purpose shown and set forth.

2. In a tank for watering stock, the combination, with a tank or reservoir having an outlet-pipe and a trough contracted toward its bottom, of a pipe fitted at its ends in the side of the trough and in the outlet-pipe, and having a perforated plate at the end fitted in the trough and a perforated valve-seat at the end fitted in the outlet-pipe, a valve-stem sliding in the perforated plate and valve-seat, and having a button at the end outside the plate, and a valve at its other end fitting over the perforated valve-seat, and a spring bearing against a projection upon the valve-stem and against the perforated valve-seat, forcing the valve-stem outward, as and for the purpose shown and set forth.

In testimony that I claim the foregoing as my own I have hereunto affixed my signature in presence of two witnesses.

FRANK J. BROWN.

Witnesses:
H. RIESEN,
J. H. ALLEN.